Sept. 24, 1929.　　　　V. F. HITT　　　　1,729,580
RUMBLE SEAT
Filed Oct. 19, 1928　　　2 Sheets-Sheet 1
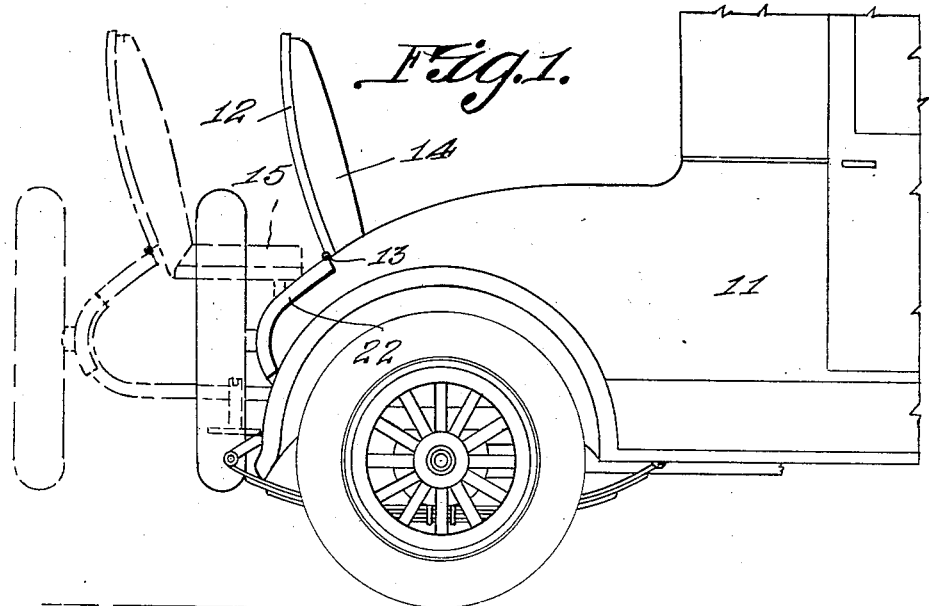
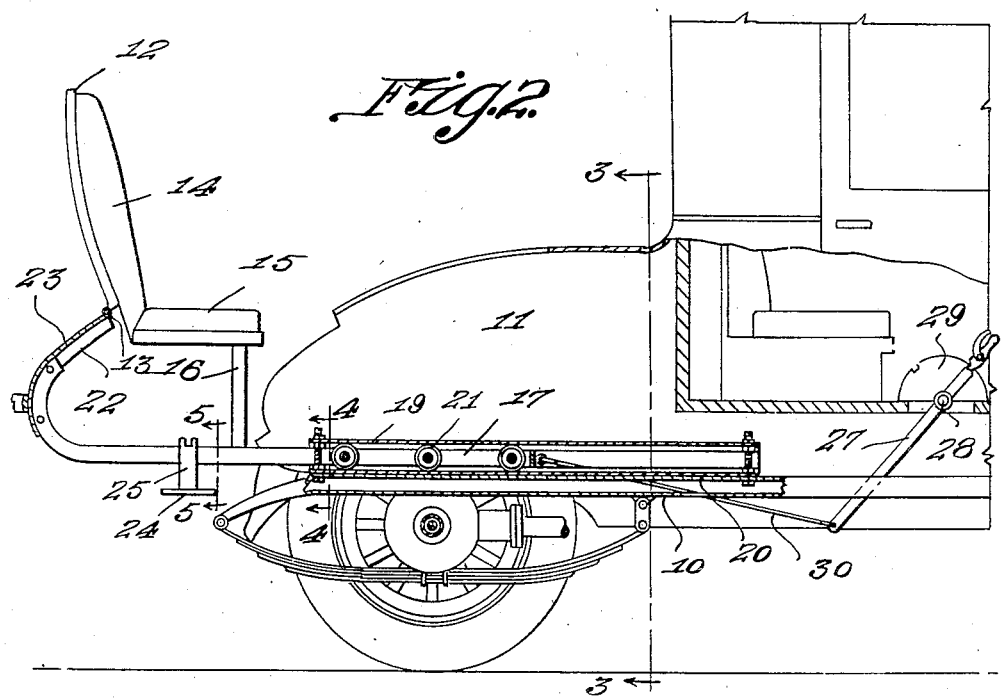
Vertington F. Hitt,
INVENTOR
BY Victor J. Evans
ATTORNEY Sept. 24, 1929.  V. F. HITT  1,729,580
RUMBLE SEAT
Filed Oct. 19, 1928  2 Sheets-Sheet 2
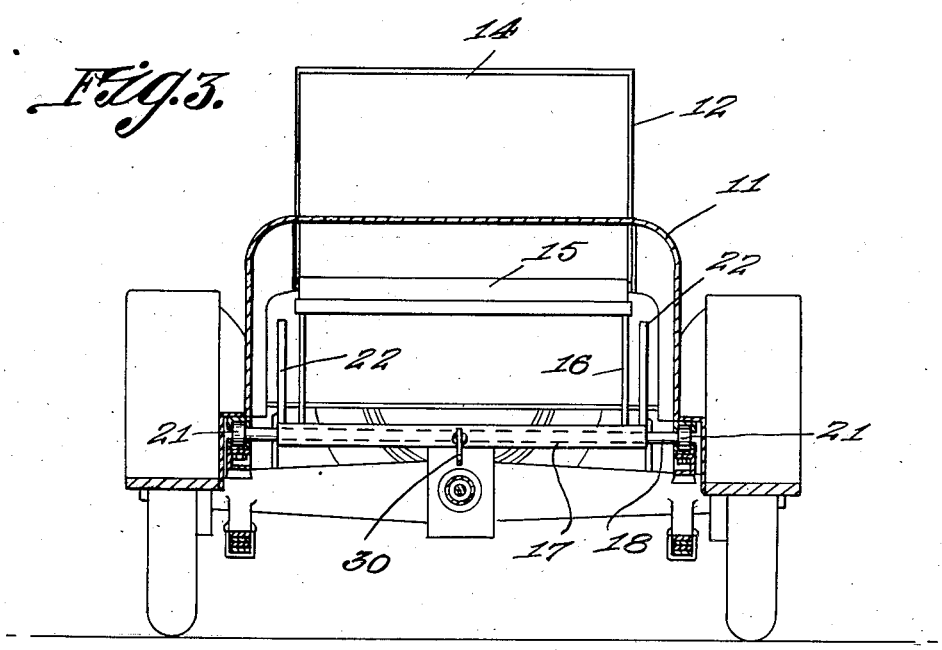
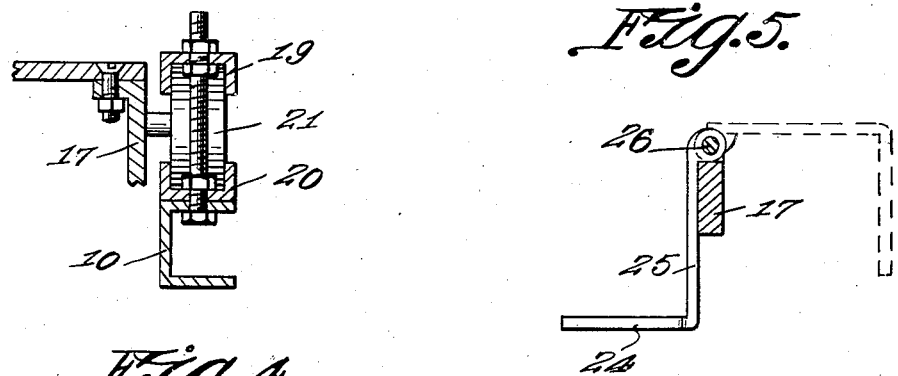
Verlington F. Hitt, INVENTOR
BY Victor J. Evans
ATTORNEY Patented Sept. 24, 1929

1,729,580

UNITED STATES PATENT OFFICE

VERLINGTON FARROW HITT, OF MIAMI BEACH, FLORIDA

RUMBLE SEAT

Application filed October 19, 1928. Serial No. 313,500.

This invention relates to auxiliary seat devices, generally known as rumble seats, for motor vehicles having coupé, convertible coupé, or roadster bodies.

An object of the invention comprehends a frame structure for the seat slidably mounted within the rear portion of the vehicle body.

Another object of the invention contemplates the provision of steps carried by the frame whereby persons entering the rear portion of the vehicle body may have direct access thereto from the steps instead of crawling over the entire body and upon step plates carried upon the vehicle chassis and fenders.

An additional object of the invention consists in the provision of an operating mechanism located within convenient reach of the vehicle driver whereby the auxiliary seat will be shifted to occupy its respective positions.

More specifically stated that portion of the vehicle body extended with the seat is adapted to carry the spare tire carrier thereon and which may be shifted between the only type of bumper capable of being employed upon the particularly equipped vehicle and which are known as bumperettes.

With the above and other objects in view, the invention further consists in the following novel features and details of construction, to be hereinafter more fully described, illustrated in the accompanying drawings and pointed out in the appended claims.

In the drawings:—

Figure 1 is a fragmentary side elevation of a vehicle coupé body, illustrating by full and dotted lines the respective positions of the auxiliary seat.

Figure 2 is a longitudinal sectional view taken through the seat, vehicle body, and sliding mechanism for the seat.

Figure 3 is a sectional view taken through line 3—3 of Figure 2.

Figure 4 is a vertical sectional view taken through the guide channels and immediate portions of the vehicle chassis to illustrate the connection and mounting of the same thereon.

Figure 5 is a view similar to Figure 4 taken on line 5—5 of Figure 2 through the slide frame and illustrating by full and dotted lines the respective positions capable of being occupied by the step plates.

Referring to the drawings in detail, wherein like characters of reference denote corresponding parts, the reference character 10 indicates the side rail of a motor vehicle chassis carrying a body 11 of the type known as the coupé. The particular body design is provided with a hatch or cover 12 hingedly mounted, as at 13, upon the rear portion thereof. Raising of the cover or hatch 12 will permit access to the tonneau of the vehicle and in many instances the under faces of the hatches or covers are upholstered, such as indicated at 14, to provide backs for what is generally known as rumble seats. The seat 15 is generally joined to the lowermost end of the back and hatch and provided with supporting legs 16 at its opposite side to sustain same in position with relation to the back.

It is my intention to obviate the usual difficulties experienced by occupants of rumble seats principally by slipping while entering or leaving same. Said occupants are generally subjected to step upon two or more step plates carried upon the rearmost projecting ends of the chassis bars and upon the tops of the rear fenders.

To obviate these difficulties, I provide a U-shaped frame 17 having the yoke end thereof projected within the vehicle tonneau. Axles 18, carried by and horizontally disposed upon the frame 17, are adapted to project the extremities thereof within raceways defined between companion oppositely disposed channel bars 19 and 20 respectively. Roller members 21 are journaled upon the ends of the axles and adapted for rotation within the raceways defined between the aforementioned oppositely located channel members 19 and 20. The extremities of the arms for the frame 17 are upwardly and rearwardly projected, as indicated at 22, and which conform in shape to that portion of the vehicle body, such as indicated at 23, severed from the body proper from the hinge connection of the hatch or cover 12 and adjacent the bottom of the tonneau. In other words, the entire seat, consisting of the hatch and seat 15, accompanied by the removed portion 23 of the body and the frame, are adapted to be shifted to occupy the Figure 2 position when passengers enter or leave the aforementioned compartment in the vehicle body. Step plates 24, having upstanding arms 25 hingedly mounted, as at 26, upon the upper side edges of the arms for the frame 17, are adapted to be shifted upon their pivot connections to occupy the dotted line positions shown in Figure 5 beneath the seat 15 when the seat is being extended or retracted.

An operating lever 27, pivotally mounted, as indicated at 28, within the floor boards of the driving compartment of the vehicle and upon a segment plate 29, is adapted for connection at its lowermost end with a pull rod 30 having connection at its lowermost end with an intermediate point in the length of the yoke end of the frame 17. The driver may extend the seat to take on passengers or retract same while seated through the operation of the lever 27. The hatch or cover 12 may be closed and locked after the manner of the conventional form rumble seat cover or commercial type coupé rear compartment cover.

As illustrated in Figure 1 of the drawings, a spare tire may be carried upon the outer side of the body portion 23 by a tire carrier suitably connected therewith.

Full length bumpers can not be carried upon the rear of the vehicle inasmuch as the same would be in the way of the tire and seat when extended and for this reason fender bumpers or bumperettes are employed instead.

The invention is susceptible of various changes in its form, proportions and minor details of construction, and the right is herein reserved to make such changes as properly fall within the scope of the appended claims.

Having described the invention, what is claimed is:—

1. An auxiliary vehicle seat for the coupé and roadster type of vehicle comprising a U-shaped frame having the yoke end thereof projected within the rear compartment thereof, axles carried by and horizontally disposed upon the frame and having the ends thereof projected appreciable distances beyond the side rails therefor, rollers journaled upon the projecting ends of the axles, spaced superimposed reversely deposed channel members carried by the vehicle adapted to provide raceways therebetween to accommodate said rollers, the outer ends of the frame being upwardly and rearwardly curved, the vehicle body having a portion removed and carried by the curved ends of the frame, a seat having connection with the removed portion of the body, and means for extending and retracting the frame and seat from the end of the vehicle.

2. An auxiliary vehicle seat for the coupé and roadster type of vehicle comprising a U-shaped frame having the yoke end thereof projected within the rear compartment thereof, axles carried by and horizontally disposed upon the frame and having the ends thereof projected appreciable distances beyond the side rails therefor, rollers journaled upon the projecting ends of the axles, spaced superimposed reversely disposed channel members carried by the vehicle adapted to provide raceways therebetween to accommodate said rollers, the ends of the frame being upwardly and rearwardly curved, the vehicle body having a portion removed and carried at the curved ends of the frame, a seat having connection with the removed portion of the body, means for extending and retracting the frame and seat from the end of the vehicle, and a step plate foldably mounted upon the frame.

In testimony whereof I affix my signature.

VERLINGTON FARROW HITT.